United States Patent Office.

HIRAM S. UTLEY, OF CHICAGO, ILLINOIS, ASSIGNOR TO THE LITHO MARBLE DECORATING COMPANY, OF SAME PLACE.

COMPOUND FOR MAKING ARTIFICIAL STONE, TILE, PLASTER, &c.

SPECIFICATION forming part of Letters Patent No. 541,818, dated June 25, 1895.

Application filed January 2, 1895. Serial No. 533,614. (No specimens.)

*To all whom it may concern:*

Be it known that I, HIRAM S. UTLEY, a citizen of the United States, residing in the city of Chicago, in the county of Cook and State of Illinois, have invented certain new and useful Improvements in Compounds for Making Artificial Stone, Tile, Plaster, &c., of which the following is a full, clear, and exact description.

This invention relates to improvements in compounds used for making artificial stone, plain and ornamental tiles, plaster for walls and pillars, statuary and ornamental molding of any kind, and has for its object to provide a new and useful composition of matter for the above purposes, which shall possess in the maximum degree the desirable qualities of hardness, toughness and susceptibility of receiving a high degree of ornamentation and polish of a permanent character.

In carrying out my invention, I employ the following ingredients, in substantially the proportions enumerated, to wit: one pound of glue dissolved in five gallons of water. Next take thirty parts of the resultant glue-water and mix with one part of saturated solution of sugar of lead or bichromate of potash. Then, with the solution thus formed, mix a sufficient amount of plaster of paris to make of the whole a plastic body. The composition thus made can be used for a variety of purposes, such as for artificial stone, for tiles, or plaster, or for ornamental molding of any kind. A very high grade of imitation marble may be made of the same compound by mixing suitable coloring matter with the compound while in a plastic state, in any well known manner, or two or more batches of the compound of different colors may be intermixed so as to produce an artificial marble having characteristics closely resembling the natural stone.

The glue-water serves to sufficiently retard the setting of the compound so that it is adapted for the various uses referred to, as well as other uses which will readily suggest themselves to one skilled in the art, while the sugar of lead or bichromate of potash serves to render the compound almost as hard as natural stone. It is preferable to use sugar of lead instead of bichromate of potash when the completed article is to be decorated with light colors, because of its transparency.

The compound has several highly desirable qualities aside from its hardness and toughness, one of which is its susceptibility of receiving a very high and brilliant polish and another its absorption, without spreading, of aniline dyes and other coloring matter. Hence the compound, in any form, can be ornamented in any way with liquid paint or pigment, by printing, painting, writing, etching or otherwise. The liquid used in ornamenting, when so applied, will not spread laterally, as is usual in compounds of this character, but will confine itself to practically the exact size and delicacy of line desired, and will penetrate or sink into the stone in proportion to the amount of color applied, thus preserving the same outline and design, so that the surface of the compound can be repeatedly cut away or worn off without materially affecting or altering the design originally applied to the surface.

The various articles made from this compound are all made by a cold process, not requiring the use of heat of any kind at any time, for the composition sets naturally in about ten hours and sets very hard, after which it may be ornamented or polished, or both, in any well known or desired manner.

Articles made of this compound may be used in either interior or exterior decoration or finish, as the compound, when set, is practically as impervious to moisture as natural stone, the combined effect of the glue and bichromate of potash or sugar of lead producing this desirable result, so that the material, when exposed to the elements or to moisture, will not swell or crack, but will retain its original shape.

Obviously bichromate of potash or sugar of lead may be used in other forms than in a saturated solution and other equivalent material, such as stucco, may be substituted for the plaster of paris, without departing from the spirit of my invention; and the coloring matter may be introduced into the compound either in the glue-water or the solution of glue-water and bichromate of potash or sugar of lead, or in the material while in a plastic state after the admixture of such solution with the plaster of paris, or after the material has set and hardened, the process of ornamenting or coloring the compound not forming a part of this invention.

What I claim, and desire to secure by Letters Patent, is—

1. A compound for making artificial stone, tile, plaster, &c., consisting of glue-water, sugar of lead or its equivalent, and plaster of paris, substantially as described.

2. The herein described compound for making artificial stone, tile, plaster and the like, consisting of glue-water, sugar of lead or its equivalent, plaster of paris, and coloring matter, substantially as described.

HIRAM S. UTLEY.

Witnesses:
 CHAS. B. BOWEN,
 M. E. SHIELDS.